Figure 1:
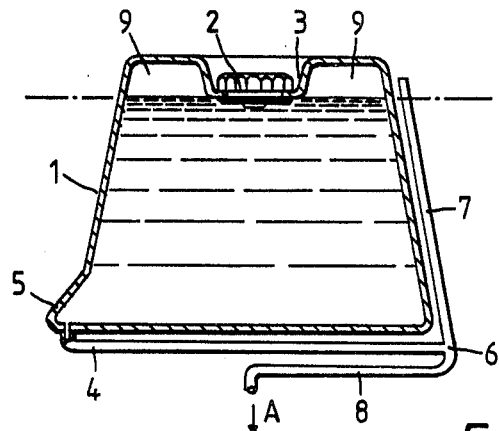

United States Patent [19]

Armour et al.

[11] 4,393,980
[45] Jul. 19, 1983

[54] LIQUID CONTAINER ARRANGED TO LIMIT UNDESIRABLE DRAINAGE

[75] Inventors: John S. Armour, Farnborough; Peter M. F. Watson, Wokingham; Graham L. Donne, Bracknell, all of England

[73] Assignee: The Minister of Transport in Her Britannic Majesty's Government of the United Kingdom of Great Britain and Northern Ireland, London, England

[21] Appl. No.: 268,030

[22] Filed: May 28, 1981

[30] Foreign Application Priority Data

Jun. 17, 1980 [GB] United Kingdom ............... 8019788

[51] Int. Cl.³ .................. B65D 25/00; F16K 45/00
[52] U.S. Cl. .................................. 220/85 S; 137/38; 137/585; 137/587; 220/85 R; 220/85 VR; 220/85 VS; 280/5 R
[58] Field of Search ............... 220/855, 900, 86 R; 137/38, 43, 44, 585, 593, 587; 280/5 H, 5 A; 244/135 C, 135 R; 141/98, 99

[56] References Cited

U.S. PATENT DOCUMENTS

| | | | |
|---|---|---|---|
| 1,287,362 | 12/1918 | Levisay et al. ............... | 220/85 S |
| 2,285,830 | 6/1942 | Paget ........................... | 244/135 R X |
| 2,373,221 | 4/1945 | Blaylock et al. .............. | 220/900 X |
| 2,404,765 | 7/1946 | Valentyne ..................... | 244/135 R |
| 2,461,096 | 2/1949 | Wagner ........................ | 220/900 X |
| 2,519,968 | 8/1950 | Jordan .......................... | 244/135 C X |
| 3,071,285 | 1/1963 | Friend .......................... | 220/86 R X |
| 3,817,421 | 6/1974 | Andres ......................... | 220/86 R X |

FOREIGN PATENT DOCUMENTS

308580 12/1919 Fed. Rep. of Germany ...... 220/900

*Primary Examiner*—Allan N. Shoap
*Assistant Examiner*—Robert Petrik
*Attorney, Agent, or Firm*—Pollock, Vande Sande & Priddy

[57] ABSTRACT

A fuel or other liquid tank for, for example, a motor cycle, comprises a nonreturn vent arranged to vent the tank when the tank is in a generally upright attitude, a filler arranged to admit liquid into the tank below the upper surface thereof, whereby in use an air space remains in the tank at all times, and a pipe for supplying liquid from the tank, said pipe extending from the base of the tank at a first side thereof and terminating as an open-ended vent in the region of the top of the tank opposite said first side, said pipe including a supply portion extending as a branch from a part of the pipe opposite said first side in the region of the base of the tank.

5 Claims, 3 Drawing Figures

LIQUID CONTAINER ARRANGED TO LIMIT UNDESIRABLE DRAINAGE

This invention relates to liquid containers such as tanks used in motor cycles to hold engine fuel.

When a motor cycle falls over, as when involved in an accident, fuel frequently drains out of the tank by way of the tank vent or the supply pipe which is connected to the engine carburetor, and this can be an additional hazard should the fuel become ignited or the engine continues to run.

The invention seeks to provide a fuel tank in which undesirable fuel flow of such a nature is substantially prevented when the tank assumes an attitude consistent with a motor cycle lying on its side.

A liquid container according to the invention is shaped and arranged to contain an air space at all times and is provided with a liquid outlet from a part of the container to which the air space will be transferred on significant sideways rotation of the container from its normal operative attitude.

In a preferred embodiment, a fuel tank has a filling orifice disposed below the level of the tank top and a sideways extending protuberance to which the fuel outlet is connected.

Figure 2:
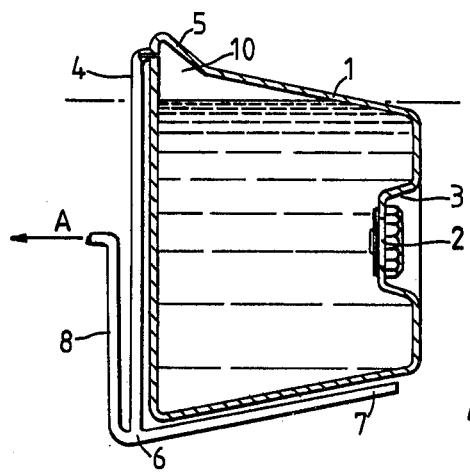
Figure 3:
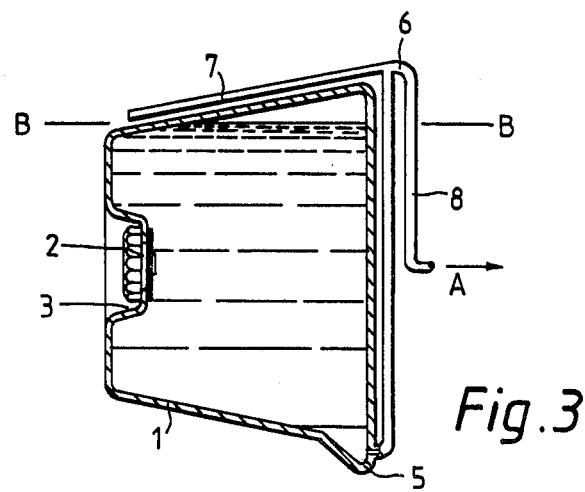

An embodiment of the invention will now be described with reference to the accompanying drawings of which FIGS. 1, 2 and 3 are similar cross-sections through a fuel tank in a normal upright position and rotated through 90° to the right and left respectively.

Referring to FIG. 1, a fuel tank 1 has a cross-section in the form of a trapezium symmetrically disposed about a vertical center line with its sides tapering inwardly towards the top. A filling orifice with a detachable cap 2 is disposed within a well 3 formed in the top surface of the tank. A fuel pipe 4 extends from within a protuberance or blister 5 formed at one side of the tank at its lowest point and passes beneath the tank to a T-junction 6 with a further pipe. One branch 7 of the further pipe extends upwardly at the side of the tank 1 and terminates at an open end situated above the level of the bottom of the well 3. The other branch 8 of the further pipe is connected to the carburetor (not shown) of an engine to which fuel is to be supplied, as indicated by the arrow A.

The maximum level of fuel in the tank will be determined by the position of the filling orifice in the well 3 so that air spaces 9 will be maintained when no additional fuel can be introduced. Fuel will pass from the blister 5 through the pipe 4 and so to the engine carburetor by way of pipe branch 8.

Should the tank be rotated to the right as in FIG. 2, the air in the tank will be displaced towards the blister 5. The volumes of the air spaces 9 are selected so that when the tank is rotated beyond a predetermined amount eg 45°, a resultant air space 10 will form in the blister to isolate the fuel pipe 4 from the fuel and the supply to the engine will be cut off.

With the tank rotated to the left as in FIG. 3 the air in the tank will be displaced so that the level of fuel falls below the T-junction 6 as indicated at B-B and again the supply to the engine will be cut off. Fuel might continue to siphon past the junction were it not for air entering the open end of pipe branch 7 which acts to destroy the siphoning action. The pipe branch 7 need be only of very small bore in order to minimize the amount of fuel which might leak from it when in the position of FIG. 2.

The tank 1 will of course require to be vented in the normal way to admit air to replace fuel as it is consumed so preventing interruption of fuel supply due to vacuum effect. Leakage can be prevented in this case by the provision of a non-return valve.

The cross-section of the tank need not be as shown provided that fuel feed to the engine is taken from a zone in which an air space will form when the tank is significantly rotated on to one side. The pipes by which fuel passes from the tank to the engine, together with the venting branch, need not be external as shown in the drawings but may be disposed within the tank envelope; the pipes might also be replaced by passages formed integrally within the tank structure.

The invention is not restricted to fuel tanks for motor cycles but may be extended generally to containers for any liquid where it is desired to restrict leakage when toppled from their normal attitudes.

We claim:

1. A liquid tank having a vent arranged to vent the tank when the tank is in a generally upright attitude, a filler arranged to admit liquid into the tank below the upper surface thereof, whereby in use an air space remains in the tank at all times, and a pipe for supplying liquid from the tank, said pipe extending from the base of the tank at a first side thereof and terminating as an open-ended vent in the region of the top of the tank opposite said first side, said pipe including a supply portion extending as a branch from a part of the pipe opposite said first side in the region of the base of the tank.

2. A liquid tank as in claim 1 having a well formed in the top surface of the tank, said filler being located in said well.

3. A liquid tak as in claim 1 wherein said tank has a sideways extending protuberant wall portion, said pipe having an inlet adjacent said protuberant wall portion whereby, when said tank is tipped in one direction from its generally upright attitude, the air space in said tank is displaced from the top of the tank to the region of said protuberant wall portion and functions to isolate said pipe inlet from the liquid in said tank.

4. A liquid tank as in claim 1 wherein said tank has sides which taper generally inwardly towards the top of said tank.

5. A motor cycle fuel tank adapted to limit the drainage of fuel from the tank when the tank is tipped from its normal generally upright attitude, said tank having a vent arranged to vent the tank when the motor cycle is in a generally upright attitude, a filler arranged to admit fuel into the tank below the upper surface of the tank, whereby in use an air space remains in the tank at all times, and a fuel pipe connected to the tank, said fuel pipe extending from the base of the tank at a first side thereof and terminating as an open-ended vent in the region of the top of the tank opposite said first side, said pipe including a supply portion extending as a branch from a part of the pipe opposite said first side of the tank in the region of the base of the tank.

* * * * *